United States Patent
Hirai et al.

(10) Patent No.: US 9,654,690 B2
(45) Date of Patent: May 16, 2017

(54) IMAGE STABILIZATION APPARATUS, IMAGE-PICKUP APPARATUS HAVING THE SAME, IMAGE STABILIZATION METHOD, AND NON-TRANSITORY COMPUTER-READABLE MEDIUM

(71) Applicant: CANON KABUSHIKI KAISHA, Tokyo (JP)

(72) Inventors: Daisuke Hirai, Utsunomiya (JP); Koji Okada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 14/576,446

(22) Filed: Dec. 19, 2014

(65) Prior Publication Data

US 2015/0189184 A1  Jul. 2, 2015

(30) Foreign Application Priority Data

Dec. 26, 2013 (JP) .................. 2013-270499

(51) Int. Cl.
*H04N 5/228* (2006.01)
*H04N 5/232* (2006.01)

(52) U.S. Cl.
CPC ..... *H04N 5/23267* (2013.01); *H04N 5/23258* (2013.01); *H04N 5/23287* (2013.01)

(58) Field of Classification Search
CPC .......... H04N 5/23248; H04N 5/23251; H04N 5/23264; H04N 5/144; H04N 5/145; G03B 2207/005; G03B 2205/0007

USPC .............. 348/208.99, 208.1–208.6
See application file for complete search history.

(56) References Cited

U.S. PATENT DOCUMENTS

| | | | |
|---|---|---|---|
| 7,590,336 B2 | 9/2009 | Higo | |
| 2005/0270380 A1* | 12/2005 | Tomita | H04N 5/23248 348/208.99 |
| 2006/0028554 A1* | 2/2006 | Usui | H04N 5/23248 348/208.99 |
| 2006/0284984 A1* | 12/2006 | Takemoto | H04N 5/23248 348/208.99 |
| 2009/0141137 A1* | 6/2009 | Watanabe | G02B 27/646 348/208.99 |
| 2011/0122269 A1* | 5/2011 | Zhao | G03B 17/00 348/208.99 |

FOREIGN PATENT DOCUMENTS

JP      2006113264 A     4/2006

* cited by examiner

*Primary Examiner* — Kelly L Jerabek
(74) *Attorney, Agent, or Firm* — Rossi, Kimms & McDowell LLP (57) ABSTRACT

An image stabilization apparatus includes a first filter, a second filter, and a signal selector configure to select as a correction signal for an image stabilization a signal obtained from an output of one of the first filter and the second filter which has a higher cutoff frequency, when the first filter has the third cutoff frequency or the second filter has the fourth cutoff frequency, and when a difference between a first output of the first filter and a second output of the second filter is larger than a threshold, and then to select as the correction signal a signal obtained from an output of the other of the first filter and the second filter which has a lower cutoff frequency.

20 Claims, 6 Drawing Sheets

IMAGE STABILIZATION APPARATUS, IMAGE-PICKUP APPARATUS HAVING THE SAME, IMAGE STABILIZATION METHOD, AND NON-TRANSITORY COMPUTER-READABLE MEDIUM

BACKGROUND OF THE INVENTION

Field of the Invention

The present invention relates to an image stabilization apparatus.

Description of the Related Art

An image stabilization apparatus is configured to detect a vibration of an image-pickup apparatus using a vibration detector, and moves an image stabilization lens or an image sensor in a direction orthogonal to the optical axis according to a detection result. A vibration signal output from the vibration detector contains a signal caused by a panning/tilting operation in addition to a signal caused by a manual vibration. When the image stabilization is simultaneous with the panning/tilting operation, a new image vibration (revibration) occurs after the panning/tilting operation ends. As a result, a user feels uncomfortable in the camera operation and captured image.

Accordingly, it has been conventionally proposed to stop the image stabilization during the panning/tilting operation and to resume it after the panning/tilting operation. Japanese Patent Laid-Open No. ("JP") 2006-113264 proposes an image stabilization apparatus configured to decrease a cutoff frequency step by step after the panning/tilting operation in accordance with an angular velocity signal representative of the camera vibration that does not instantly becomes zero and gradually approaches to zero.

Due to a time constant, a filter having a low cutoff frequency needs a long time for the steady state necessary for a desired performance. The steady state can be obtained more quickly by switching the cutoff frequency stepwise as in JP 2006-113264. However, when a large vibration occurs while the cutoff frequency is being switched, the method according to JP 2006-113264 cannot fully remove a vibration amount at the switching end timing. When this signal is used for a signal captured in exposure, the quality of the captured image degrades due to the vibration.

SUMMARY OF THE INVENTION

The present invention provides an image stabilization apparatus, an image-pickup apparatus having the same, an image stabilization method, and a non-transitory computer-readable medium, which can quickly and highly precisely realize an image stabilization.

An image stabilization apparatus according to the present invention includes a first filter configured to receive an output signal from a vibration detector and to gradually decrease a frequency component lower than a first cutoff frequency in the output signal, a second filter configured to receive the output signal and to gradually decrease a frequency component lower than a second cutoff frequency in the output signal, a first cutoff frequency switch configured to gradually decrease the first cutoff frequency in the first filter to a third cutoff frequency lower than the first cutoff frequency, a second cutoff frequency switch configured to gradually decrease the second cutoff frequency in the second filter to a fourth cutoff frequency lower than the second cutoff frequency, and a signal selector configure to select as a correction signal for an image stabilization a signal obtained from an output of one of the first filter and the second filter which has a higher cutoff frequency, and thereafter to select as the correction signal a signal obtained from an output of the other of the first filter and the second filter which has a lower cutoff frequency, when the first filter has the third cutoff frequency or the second filter has the fourth cutoff frequency, and in a case a difference between a first output of the first filter and a second output of the second filter is larger than a threshold.

Further features of the present invention will become apparent from the following description of exemplary embodiments with reference to the attached drawings.

DESCRIPTION OF THE EMBODIMENTS

Figure 1:
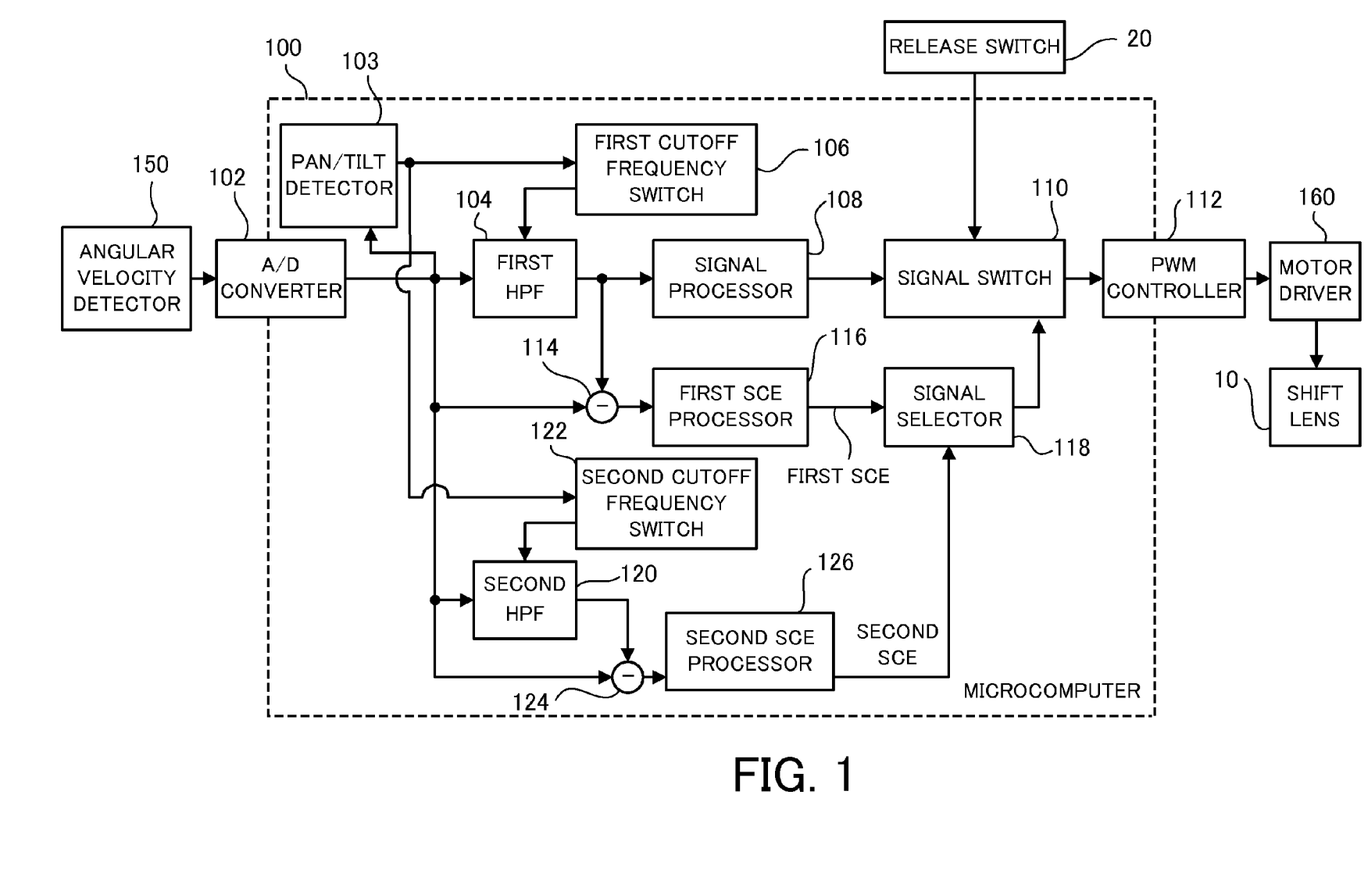
FIG. 1 is a block diagram of an image stabilization apparatus according to this embodiment.

FIG. 1 is a block diagram of an image stabilization apparatus according to this embodiment. The image stabilization apparatus decenters an image-pickup optical system according to a detection result of a vibration detector configured to detect a vibration of an image-pickup apparatus. This configuration stabilizes an optical image formed by an image-pickup optical system (not illustrated) and optically stabilizes a captured image.

This embodiment will discuss, but not be limited to, a digital video camera as an example of an image-pickup apparatus. The image stabilization apparatus is applicable to a digital still camera, a digital video camera, a television camera, or another image-pickup apparatus, such as a cellular phone, a game machine, and a personal computer.

In this embodiment, the image-pickup apparatus includes, but is not limited to, an image-pickup optical system integrated with an image-pickup apparatus body including an image sensor. This embodiment is applicable to an image-pickup apparatus (image-pickup system) that includes an image-pickup apparatus body and a lens unit that can be attached to and detached from the image-pickup apparatus body and includes the image-pickup optical system. In that case, the image stabilization apparatus may be provided to one of the lens unit and the image-pickup apparatus body. The image sensor photoelectrically converts an optical image formed by the image-pickup apparatus.

This embodiment provides the image stabilization by moving part of the image-pickup optical system (or a shift lens 10 as an image stabilization lens) but may move the image sensor.

The shift lens 10 moves in a two-dimensional plane orthogonal to the image-pickup optical axis (not illustrated) (or in an optical-axis orthogonal direction) and changes an incident angle of a light flux incident upon an image plane of the image sensor. The shift lens 10 is configured to move in the direction orthogonal to the optical axis for the image stabilization, but it is sufficient that the orthogonal direction has a component orthogonal to the optical axis and the shift lens 10 may be moved obliquely to the optical axis.

The image-pickup apparatus includes a release switch 20. When the release switch 20 is half-pressed, a first switch (SW1) (not illustrated) turns on and the autofocus ("AF"), photometry, and image stabilization control start. When the release switch 20 is fully pressed, a second switch (SW2) (not illustrated) turns on and the image pickup (exposure) is performed.

The image stabilization apparatus according to this embodiment includes a microcomputer 100, an angular velocity detector 150, and a motor driver 160.

The angular velocity detector (vibration detector) 150 includes, for example, a gyro sensor, detects an angular velocity (vibration information) of a vibration applied to the image pickup apparatus caused by a manual vibration, etc. and outputs an electric signal (vibration signal) according to the angular velocity. In this embodiment, the angular velocity detector 150 includes two angular sensors for two axial directions, such as a horizontal (yaw) rotating axis and a vertical (pitch) rotating axis on the plane orthogonal to the optical axis, so as to maintain two perpendicular detection axes. The angular velocity detector 150 detects an angular velocity for each axis of the horizontal and vertical directions.

The microcomputer 100 (controller) calculates a correction amount by processing an angular velocity signal output from the angular velocity detector 150, and controls driving of the shift lens 10 by the motor driver 160 in two axes directions, i.e., the horizontal and vertical directions. Since a calculation of a correction amount and a driving control of the shift lens 10 in each of the horizontal (yaw) rotating axis and the vertical (pitch) rotating axis can be realized by similar processing, the following description will discuss only one of the axes.

The microcomputer 100 includes an A/D converter 102, a pan/tilt detector 103, a first high-pass filter ("HPF") 104, a first cutoff frequency switch 106, a signal processor 108, a signal switch 110, and a pulse width modulation ("PWM") controller 112, a first subtracter 114, a first signal-calculated-in-exposure ("SCE") processor 116, a signal selector 118, a second HPF 120, a second cutoff frequency switch 122, a second subtracter 124, and a second SCE processor 126.

The A/D converter 102 converts an analogue electric signal output from the angular velocity detector 150 into a digital signal. The A/D converter 102 outputs a vibration signal as the digital signal to the pan/tilt detector 103, the first HPF 104, the first subtracter 114, the second HPF 120, and the second subtracter 124. The A/D converter 102 may be integrated with the angular velocity sensor 150. This embodiment provides the first HPF 104 and the second HPF 120 subsequent to the A/D converter 102, but the first HPF 104 and the second HPF 120 may be provided prior to the A/D converter 102.

The pan/tilt detector 103 detects a start and an end of the pan/tilt operation based on the output signal from the A/D converter 102. When detecting the end of the pan/tilt operation, the pan/tilt detector 103 outputs a corresponding signal to the first cutoff frequency switch 106 and the second cutoff frequency switch 122. Using this signal as a trigger, each of the first cutoff frequency switch 106 and the second cutoff frequency switch 122 starts switching the cutoff frequency.

The first HPF 104 outputs a high frequency component of the vibration signal by cutting a low frequency component contained in the vibration signal output from the A/D converter 102. The HPF is a filter configured to little attenuate a high frequency component higher than the cutoff frequency and to reduce a low frequency component lower than the cutoff frequency. An output of the first HPF 104 is supplied to the signal processor 108 and the first subtracter 114.

The vibration signal output from the angular velocity detector 150 often contains an offset component that prevents the output of the vibration signal from becoming 0 even when no vibrations are applied to the angular velocity detector 150. This offset output is subject to the individual performance scattering, temperature changes, and changes over time, and is variable. When a photographer intentionally shakes the image-pickup apparatus in one direction as in the panning/tilting operation, the vibration from the angular velocity detector 150 may also contain a noise signal similar to the offset component. Therefore, this embodiment removes a very low frequency component as the offset component using the first HPF 104. Since the low frequency component is also contained in the manual vibration frequency, the cutoff frequency of the first HPF 104 is set as low as possible so as to remove the offset component. However, the filter having a low cutoff frequency needs a long time for the steady state necessary for the desired performance due to the time constant.

The first cutoff frequency switch 106 switches (gradually decreases) the cutoff frequency of the first HPF 104 in response to a signal as a starting trigger which represents an end of the panning/tilting operation from the pan/tilt detector 103.

The signal processor 108 provides an integration and a phase compensation to an output signal from the first HPF 104. The output of the signal processor 108 is supplied to the signal switch 110. This output is a signal used primarily for aiming but may be used for exposure.

Herein, "aiming" is a capture preparing state in which the image stabilization is acting, and is a period other than the exposure period. In the still image pickup, a photographer operates the release switch 20 and provides capturing setting, and then determines a composition through an optical or electronic viewfinder (not illustrated). In using the optical viewfinder, the photographer introduces a light flux from the image-pickup optical system to the viewfinder optical system via a main mirror (not illustrated), and observes the object through the optical viewfinder. In using the electronic viewfinder, the photographer moves up the main mirror and sub-mirror, introduces the light flux to the image sensor to display the image obtained by the image sensor on an LCD provided on the back surface of the image-pickup apparatus, and observes the object (live view).

The signal switch 110 selects the output signal from the signal processor 108 when the release switch 20 turns on the SW1, and selects the signal selected by the signal selector 118 when the release switch 20 turns on the SW2. Nevertheless, as described later, the signal switch 110 may select the output signal from the signal processor 108 when the release switch 20 turns on the SW2. The output from the signal switch 110 is supplied to the PWM controller 112.

The pulse width modulator (PWM) controller 112 modulates a digital signal from the signal switch 110 into a (PWM) waveform configured to change a duty ratio of a pulsed wave and supplies the resultant signal to the motor driver 160.

The motor driver 160 drives a motor (not illustrated), such as a voice coil motor, which is a driving unit configured to drives the shift lens 10 based on the control signal supplied from the PWM controller 112. Thereby, the shift lens 10 moves in a direction orthogonal to the optical axis of the image-pickup optical system.

The first subtracter 114 subtracts the output signal from the first HPF 104 from the output signal of the A/D converter 102 (input signal to the first HPF 104). The output from the first subtracter 114 is supplied to the first SCE processor 116.

The first SCE processor 116 provides a gain adjustment and a phase compensation to an output signal (signal calculated in exposure or SCE) from the first subtracter 114, generates the first SCE, and outputs the first SCE to the signal selector 118.

The signal selector 118 selects one of the output from the first SCE processor 116 (or first SCE) and the output from the second SCE 126 (or second SCE), as a correction signal used to optically stabilize the captured image.

The second HPF 120 outputs a high frequency component of the vibration signal by cutting the low frequency component in the vibration signal output from the A/D converter 102. The second HPF 120 has a cutoff frequency lower than that of the first HPF 104. The output from the second HPF 120 is supplied to the second subtracter 124.

The second cutoff frequency switch 122 switches (gradually decreases) the cutoff frequency of the second HPF 120 in response to a signal as a starting trigger which represents the end of the panning/tilting operation from the pan/tilt detector 103.

The second subtracter 124 subtracts the output signal from the second HPF 120 from the output signal of the A/D converter 102 (input signal to the second HPF 120). The output from the second subtracter 124 is supplied to the second SCE processor 126.

The second SCE processor 126 provides a gain adjustment and a phase compensation to the output signal (SCE) from the second subtracter 124, generates the second SCE, and outputs the second SCE to the signal selector 118.

In the image stabilization in the aiming, the first HPF 104 is used. In order to remove only the low frequency component irrelevant to the manual vibration, it is necessary to set the cutoff frequency to a low value, such as 0.01 Hz, but such a low cutoff frequency results in a high time constant and needs a long convergence time.

Figure 2A:
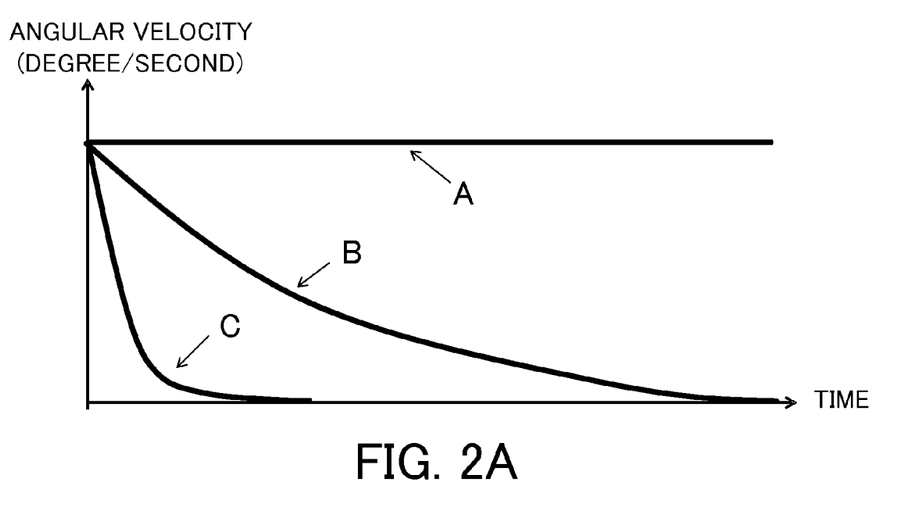
FIG. 2A is a graph of an output of an HPF to an input of a vibration signal having a certain offset and FIG. 2B is a graph of an output of a cutoff frequency of the HPF to the input.
Figure 2B:
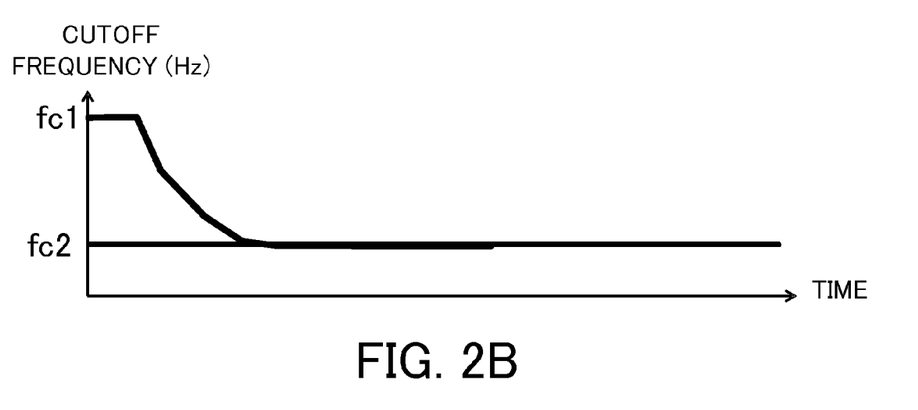

FIG. 2A is a graph that illustrates an output of the HPF in response to an input of the vibration signal having a constant offset component, where an abscissa axis denotes time, and the ordinate axis denotes an angular velocity (degree/second) from the HPF. FIG. 2B is a graph that illustrates a variation of a cutoff frequency of the HPF, where an abscissa axis denotes time, and an ordinate axis denotes a cutoff frequency.

In FIG. 2A, "A" denotes an input of a constant value, "B" denotes an output to the input A when the cutoff frequency is set to fc2 of the HPF. The time constant of the HPF with the cutoff frequency fc2 is expressed by $1/2\pi fc2$. Now assume that fc2 is 0.01 Hz. Then the time constant becomes 15.9 seconds, which is a very long convergence time on 0.

Accordingly, as illustrated in FIG. 2B, the cutoff frequency of the HPF is gradually decreased from fc1 to fc2 lower than fc1 with time. "C" in FIG. 2A illustrates the output in that case. When "B" and "C" in FIG. 2A are compared with each other, it is understood that "C" is converged on 0 more quickly than "B."

The first cutoff frequency switch 106 switches the cutoff frequency of the first HPF 104 at a necessary timing, such as when the image-pickup apparatus is powered on and when the end of the panning operation is detected, so as to quickly converge the output of the first HPF 104. The signal that passes the first HPF 104 undergoes the integration and phase compensation at the signal processor 108 so as to turn into the target signal used to move the shift lens 10 to the target position. The target signal is output as the PWM signal from the PWM controller 112 through the signal switch 110. The output PWM signal is input to the motor deriver 160 and used to drive the shift lens via the driving voltage output from the driving voltage output from the motor driver 160.

The signal processor 108 performs an integration filtering operation with a predetermined cutoff frequency for the output signal from the first HPF 104 used for aiming, preventing an overcorrection of a low frequency vibration and maintaining a natural view and an easy angular adjustment.

On the other hand, the SCE realizes a high correction performance by correcting a low frequency vibration. The first subtracter 114 subtracts the output signal of the first HPF 104 from the input signal of the first HPF 104, and generates a signal as if a low-pass filter (LPF) signal is calculated in which the offset component is removed. The first SCE processor 116 provides a gain adjustment and a phase compensation to the output signal from the first subtracter 114, generates the first SCE in which a lower frequency component can be corrected than in the aiming, and outputs the first SCE signal to the signal selector 118.

As disclosed in JP 2006-113264, the output of the HPF may be used for exposure. In this case, the first subtracter 114 and the second subtracter 124 are removed and the output of the first HPF 104 is supplied to the first SCE processor 116 and the output of the second HPF 120 is supplied to the second SCE processor 126.

The second cutoff frequency switch 122 switches the cutoff frequency of the second HPF 120. The second subtracter 124 subtracts the output signal of the second HPF 120 from the input signal of the second HPF 120, and generates a signal as if a LPF signal in which the offset component is removed is calculated. The second SCE processor 126 provides a gain adjustment and a phase compensation to the output signal from the second subtracter 124, and thereby the second SCE signal is generated and output to the signal selector 118.

The cutoff frequency of the second HPF 120 is set to be lower than that of the first HPF 104, and thus the lower frequency vibration in the second SCE than that of the first SCE can be corrected but it takes a longer convergence time on the steady state.

The signal selector 118 selects one of the first SCE and the second SCE for the correction signal as described later. In principle, the signal switch 110 switches processing during aiming and processing during exposure in accordance with the operation of the release switch 20.

Referring now to FIGS. 3A to 4D, the output from the HPF will be described when the vibration occurs during switching of the cutoff frequency.

Figure 3A:
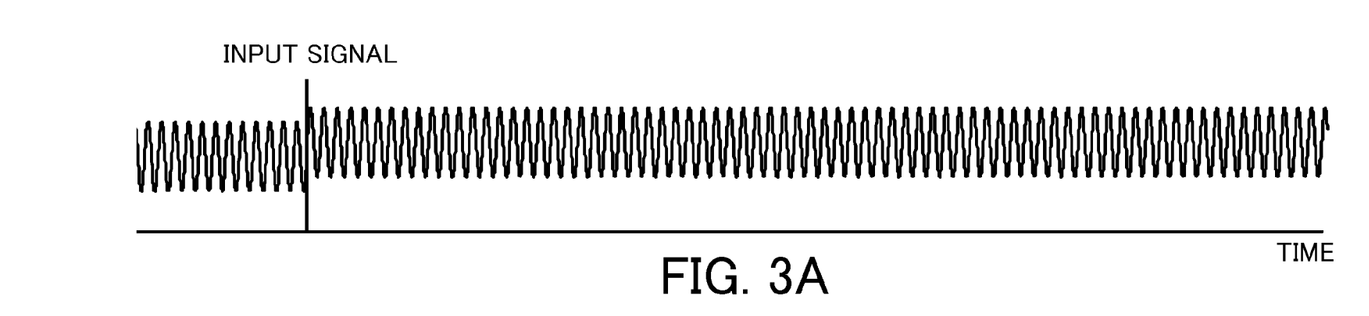
FIGS. 3A, 3B, and 3C are graphs for explaining illustrative cutoff frequency switching of the HPF.
Figure 3B:
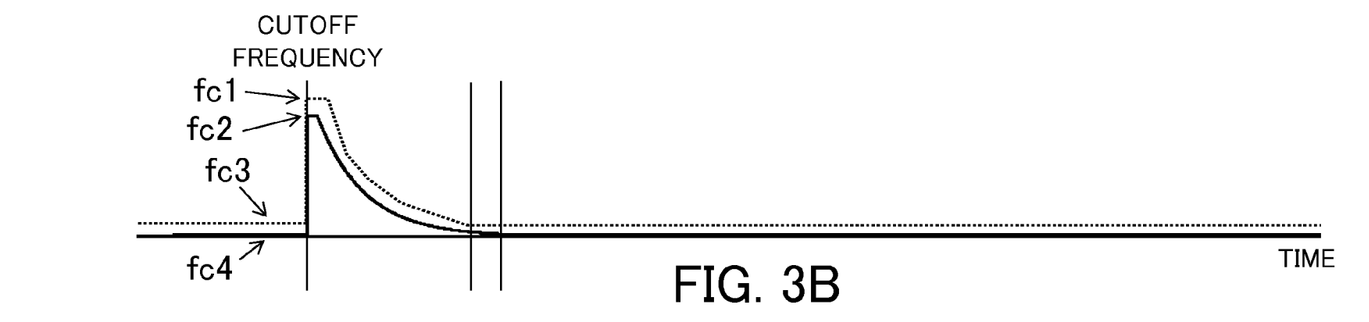
Figure 3C:
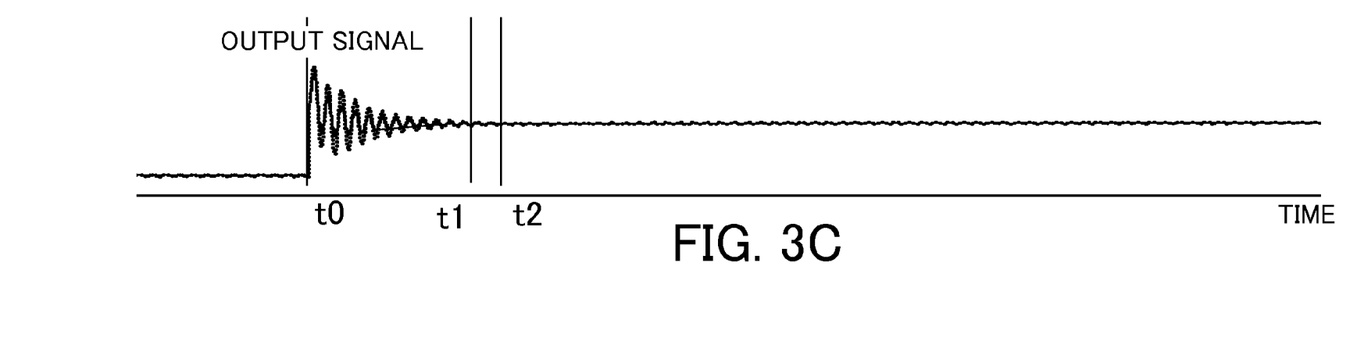

FIGS. 3A, 3B and 3C are graphs that illustrate no vibrations near the offset component occur during switching of the cutoff frequency of the HPF. FIG. 3A illustrates an input signal to each of the first HPF 104 and the second HPF 120 (or the output signal from the A/D converter 102), where an abscissa axis denotes time and an ordinate axis denotes an input signal to each HPF. As illustrated in FIG. 3A, the input signal is steady after time to.

FIG. 3B is a graph of an example in which the first cutoff frequency switch 106 switches the cutoff frequency of the first HPF 104 (as illustrated by a dotted line) and an example in which the second cutoff frequency switch 122 switches the cutoff frequency of the second HPF 120 (as illustrated by a solid line). In FIG. 3B, an abscissa axis denotes time, and an ordinate axis denotes a cutoff frequency.

In FIG. 3B, the first cutoff frequency switch 106 switches the cutoff frequency of the first HPF 104 from fc1 to fc3 between time t0 and time t1. The second cutoff frequency switch 122 switches the cutoff frequency of the second HPF 120 from fc2 to fc4 between time t0 and time t1. Herein, the first cutoff frequency fc1 is higher than the second cutoff frequency fc2 (fc1>fc2), and the third cutoff frequency is higher than the fourth cutoff frequency fc4 (fc3>fc4). The first cutoff frequency fc1 is higher than the third cutoff frequency fc3 (fc1>fc3), and the second cutoff frequency is higher than the fourth cutoff frequency (fc2>fc4).

FIG. 3C is a graph of the output signal from the first SCE processor 116 (the first SCE) (as illustrated by a dotted line) and the output signal from the second SCE processor 126 (the second SCE) (as illustrated by a solid line), when the cutoff frequency is changed, as illustrated in FIG. 3B. In FIG. 3C, an abscissa axis denotes time, and an ordinate axis denotes an output signal from each HPF.

In FIG. 3C, if switching of the cutoff frequency starts at time t0 and only a normal image vibration component occurs without any panning operations in switching the cutoff frequency, there is few difference between the output of the first SCE and the output of the second SCE. The output becomes stable at time t2 when switching of the cutoff frequency of the second HPF 120 ends.

Figures 4A, 4B:
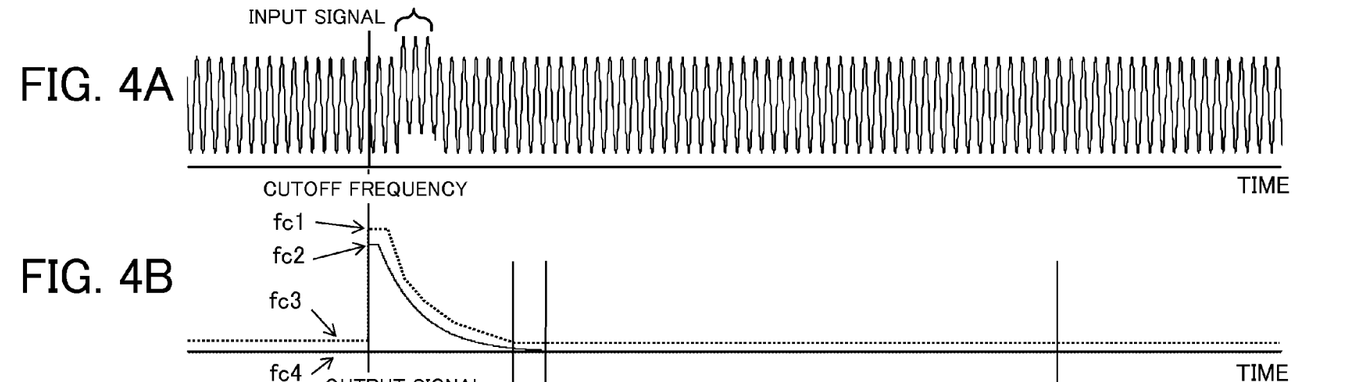
FIGS. 4A, 4B, 4C, and 4D are graphs for explaining other illustrative cutoff frequency switching of the HPF.

FIGS. 4A, 4B, 4C, and 4D are graphs that illustrate vibrations near the offset component occur during switching of the cutoff frequency of the HPF. FIG. 4A illustrates an input signal to each of the first HPF 104 and the second HPF 120 (or the output signal from the A/D converter 102), where an abscissa axis denotes time and an ordinate axis denotes an input signal to each HPF. As illustrated in FIG. 4A, the input signal has a vibration V between time t0 and time t1.

FIG. 4B is a graph of an example in which the first cutoff frequency switch 106 switches the cutoff frequency of the first HPF 104 (as illustrated by a dotted line) and an example in which the second cutoff frequency switch 122 switches the cutoff frequency of the second HPF 120 (as illustrated by a solid line). In FIG. 4B, an abscissa axis denotes time, and an ordinate axis denotes a cutoff frequency.

In FIG. 4B, the first cutoff frequency switch 106 switches the cutoff frequency of the first HPF 104 from fc1 to fc3 between time t0 and time t1. The second cutoff frequency switch 122 switches the cutoff frequency of the second HPF 120 from fc2 to fc4 between time t0 and time t1. Similar to FIGS. 3A, 3B and 3C, the first cutoff frequency fc1 is higher than the second cutoff frequency fc2 (fc1>fc2), and the third cutoff frequency is higher than the fourth cutoff frequency fc4 (fc3>fc4). The first cutoff frequency fc1 is higher than the third cutoff frequency fc3 (fc1>fc3), and the second cutoff frequency is higher than the fourth cutoff frequency (fc2>fc4).

Figures 4C, 4D:
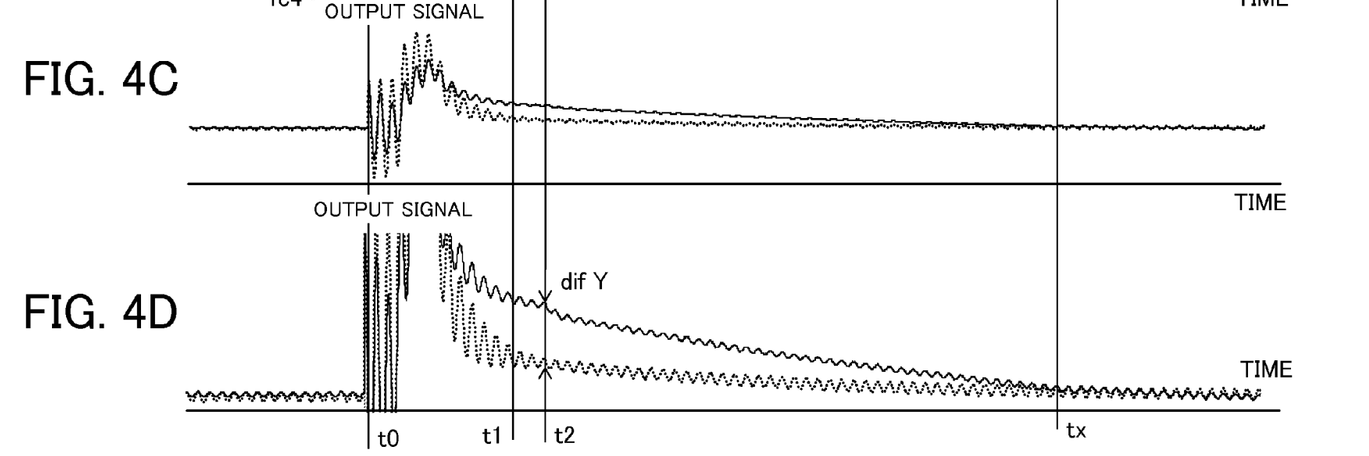

FIG. 4C is a graph of the output signal from the first SCE processor 116 (the first SCE) (as illustrated by a dotted line) and the output signal from the second SCE processor 126 (the second SCE) (as illustrated by a solid line), when the cutoff frequency is changed as illustrated in FIG. 4B. In FIG. 4C, an abscissa axis denotes time, and an ordinate axis denotes an output signal from each HPF.

FIG. 4D is a partially enlarged view of FIG. 4C. When the vibration near the offset component occurs in switching the cutoff frequency, as illustrated in FIG. 4A, the first SCE and the second SCE change as if they follow the input offset component as illustrated in FIG. 4C. Due to a different cutoff frequency switching timing, a difference difY occurs between the first SCE and the second SCE occurs at time t2, where difY=(second SCE)−(first SCE).

Even with a significant vibration, the cutoff frequency of the first HPF 104 is fc3 at time t1, and the cutoff frequency of the second HPF 120 is fc4 at time t2.

While the first SCE is almost stable at time t2 whereas the second SCE becomes finally stable around time tx. When the second SCE is used for exposure between time t2 and time tx, a motion other than the manual vibration is exposed and the capture image blurs. It is therefore effective to avoid using the second SCE.

Figure 5:
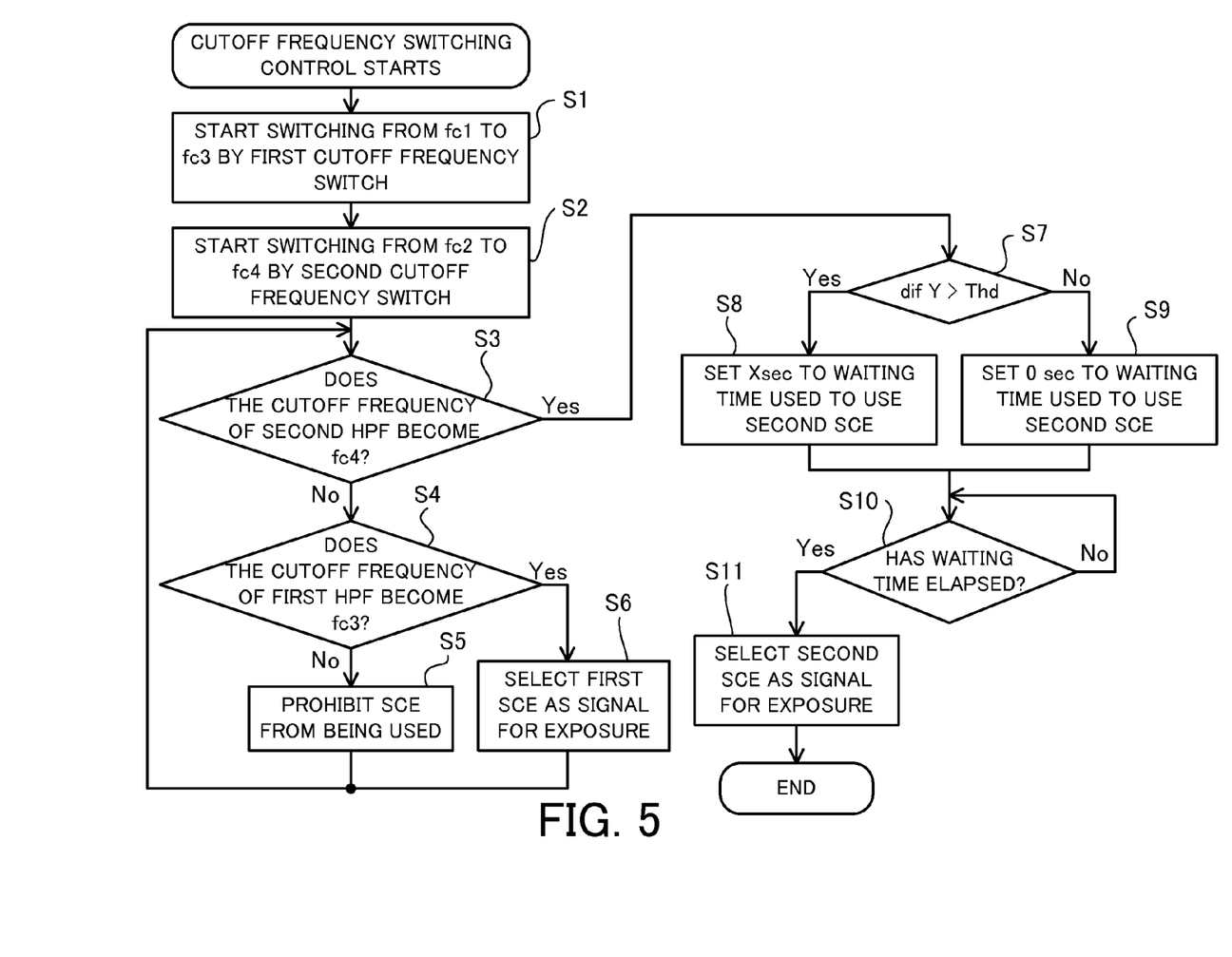
FIG. 5 is a flowchart of an image stabilization method executed by a microcomputer illustrated in FIG. 1.

FIG. 5 is a flowchart for explaining an operation of the microcomputer 100 according to this embodiment, and "S" stands for the step. The flowchart illustrated in FIG. 5 can be implemented by a program that enables a computer to execute each step, and the program can be stored in a recording medium, such as a non-transitory computer readable medium.

When pan/tilt detector 103 detects the end of the panning/tilting operation by the photographer, the cutoff frequency switching control starts. Initially, as illustrated in FIGS. 3A to 4D, the first cutoff frequency switch 106 starts switching the cutoff frequency from fc1 to fc3 (S1), and the second cutoff frequency switch 122 starts switching the cutoff frequency from fc2 to fc4 (S2).

Next, the second cutoff frequency switch 122 determines whether the cutoff frequency of the second HPF 120 is switched to fc4 (S3). When switching of the cutoff frequency of the second HPF 120 ends (Yes of S3), the flow moves to S7 and the flow moves to S4 when switching has not yet been completed (No of S3). In S4, the first cutoff frequency switch 106 determines whether the cutoff frequency of the first HPF 104 is switched to fc3. When the cutoff frequency of the first HPF 104 does not become fc3 in S4 (No of S4), time t1 has not yet elapsed in FIGS. 3A to 4D. In this state, the offset component has not yet been removed, and using both the first SCE and the second SCE during exposure is prohibited (S5). In this case, signal switching by the signal switch 110 is prohibited and the output signal from the signal processor 108 is used during exposure. The flow returns to S3 after S5.

On the other hand, when the cutoff frequency of the first HPF 104 becomes fc3 in S4 (Yes of S4), time t1 has elapsed in FIG. 3A to 4D. In this case, the signal selector 118 selects the first SCE for the signal for exposure (S6). Thereby, the first SCE is used for the exposure in which a lower frequency component can be corrected. The flow returns to S3 after S6.

On the other hand, when the cutoff frequency of the second HPF 120 becomes fc4 in S3 (Yes of S3), time t2 has elapsed in FIGS. 3A to 4D. In this state, the second cutoff frequency switch 122 determines whether the output difference difY between the first SCE and the second SCE is larger than a threshold Thd (S7). When difY is larger than Thd (difY>Thd) (Yes of S7), the flow moves to S8 because a significant vibration occurs as in FIGS. 4A to 4D in switching the cutoff frequency. On the other hand, when the output difference difY is equal to or smaller than the threshold Thd (No of S7), the flow moves to S9 because switching of the cutoff frequency normally ends as in FIG. 3A.

In S8, the second SCE may have a residue offset component, and thus a waiting time period is set to a predetermined time period X (seconds), which is used to make the second SCE available. This time period depends upon fc4, and is set to be longer as a value of fc4 is lower. In FIGS. 4A to 4D, X=tx−t2.

In S9, the output difference between the first SCE and the second SCE is small, and thus the offset component has been removed from the second SCE. Therefore, the waiting time period is set to 0 which is used to make the second SCE available. As a result, the second SCE can be readily used for the exposure.

After S8 or S9, the signal selector 118 determines whether the waiting time period has elapsed which is used to make the second SCE available (S10). When determining that the waiting time period has elapsed (Yes of S10), the signal selector 118 selects the second SCE as the signal for the exposure (S11) and ends processing. On the other hand, when determining that the waiting time period has not yet elapsed (No of S10), the signal selector 118 waits until the waiting time elapses, and selects the first SCE for the signal for exposure in this waiting period.

As described, the filter output can become quickly steady by changing the cutoff frequency from a high value to a low value. The signal processor calculates the output signals from a plurality of HPF and compares the difference (difY) of the calculation result when switching of the cutoff frequency is completed at time t2, with the threshold (Thd). Thereby, it can be determined whether a large vibration occurs in switching the cutoff frequency and whether the offset component has been removed at the ending time. The captured image can be stabilized by prohibiting the SCE in which the offset component has not yet been removed, from being used. When it is determined that the offset removal is not affected, the signal that can correct a lower frequency manual vibration can be used as the signal for exposure for higher image quality.

Time t2 corresponds to a later one of time when the cutoff frequency of the first HPF 104 becomes the third cutoff frequency and time when the cutoff frequency of the second HPF 120 becomes the fourth cutoff frequency. The difference difY is a difference of the output of the first HPF 104 (first output) and the output of the second HPF 120 (second output). In FIG. 5, S11 corresponds to a selection of an output as a correction signal of one of the first HPF 104 and the second HPF 120 which has a lower cutoff frequency, after the predetermined time has elapsed. S10 corresponds to a selection of an output as a correction signal of one of the first HPF 104 and the second HPF 120 which has a higher cutoff frequency.

Figure 6:
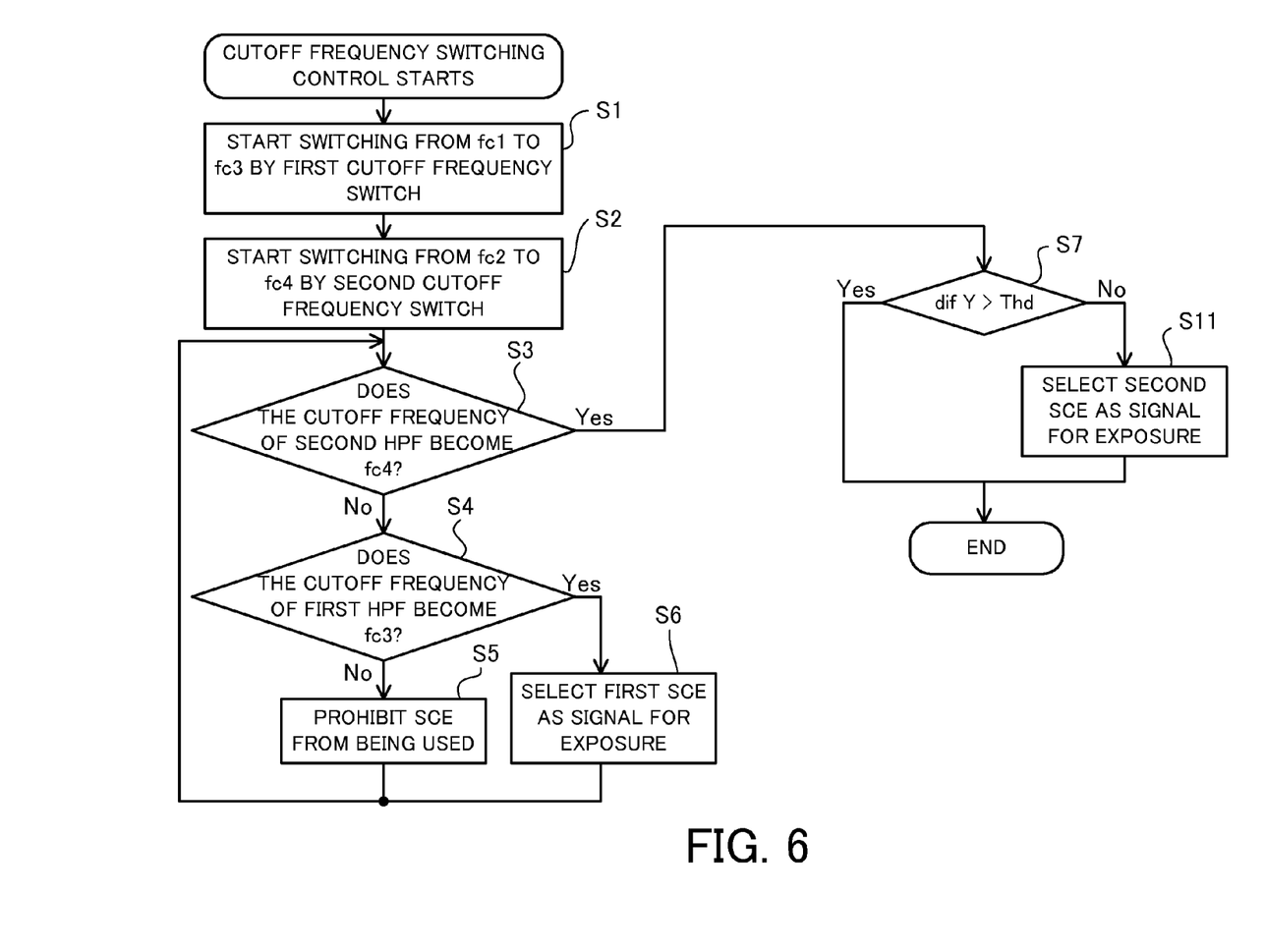
FIG. 6 is a flowchart of a variation of the image stabilization method illustrated in FIG. 5.

FIG. 6 is a variation of FIG. 5, and those steps in FIG. 6 which are corresponding steps in FIG. 5 will be designated by the same reference numerals. In FIG. 6, the processing ends with Yes of S7 and the first SCE is selected as the correction signal based on S6. In other words, the signal selector 118 selects the first SCE as the correction signal when difY is higher than Thd, and the second SCE as the correction signal when difY is equal to or smaller than Thd at time t2. S9 to S11 may be provided similar to FIG. 5 in case of No in S7.

Yes in S7 in FIG. 6 corresponds to a selection as a correction signal of an output of one of the first HPF 104 and the second HPF 120 which has a higher cutoff frequency. S11 corresponds to a selection of a correction signal of an output of one of the first HPF 104 and the second HPF 120 which has a lower cutoff frequency. FIG. 6 has an effect similar to that of FIG. 5.

The present invention can provide an image stabilization apparatus, an image-pickup apparatus having the same, an image stabilization method, and a non-transitory computer-readable medium, which can quickly and highly precisely provide an image stabilization.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-270499, filed Dec. 26, 2013 which is hereby incorporated by reference herein in its entirety.

What is claimed is:

1. An image stabilization apparatus comprising:
    a first filter configured to receive an output signal from a vibration detector and to gradually decrease a frequency component lower than a first cutoff frequency in the output signal;
    a second filter configured to receive the output signal and to gradually decrease a frequency component lower than a second cutoff frequency in the output signal;
    a first cutoff frequency switch configured to gradually decrease the first cutoff frequency in the first filter to a third cutoff frequency lower than the first cutoff frequency;
    a second cutoff frequency switch configured to gradually decrease the second cutoff frequency in the second filter to a fourth cutoff frequency lower than the second cutoff frequency; and
    a signal selector configured to select as a correction signal for an image stabilization a signal obtained from an output of one of the first filter and the second filter which has a higher cutoff frequency, and thereafter to select as the correction signal a signal obtained from an output of the other of the first filter and the second filter which has a lower cutoff frequency, when the first filter has the third cutoff frequency or the second filter has the fourth cutoff frequency.

2. The image stabilization apparatus according to claim 1, wherein the signal selector selects as the correction signal the signal obtained from the output of the other of the first filter and the second filter which has the lower cutoff frequency in a case where a difference between a first output of the first filter and a second output of the second filter is equal to or smaller than a threshold.

3. The image stabilization apparatus according to claim 1, wherein the third cutoff frequency is higher than the fourth cutoff frequency.

4. The image stabilization apparatus according to claim 1, further comprising:
a first subtracter configured to subtract a first output of the first filter from a first input of the first filter; and
a second subtracter configured to subtract a second output of the second filter from a second input of the second filter,
wherein the signal selector selects as the correction signal an output of one of the first subtracter and the second subtracter which subtracts the output of the other of the first filter and the second filter which has the lower cutoff frequency.

5. An image stabilization apparatus comprising:
a first filter configured to receive an output signal from a vibration detector and to gradually decrease a frequency component lower than a first cutoff frequency in the output signal;
a second filter configured to receive the output signal and to gradually decrease a frequency component lower than a second cutoff frequency in the output signal;
a first cutoff frequency switch configured to gradually decrease the first cutoff frequency in the first filter to a third cutoff frequency lower than the first cutoff frequency;
a second cutoff frequency switch configured to gradually decrease the second cutoff frequency in the second filter to a fourth cutoff frequency lower than the second cutoff frequency; and
a signal selector configured to select as a correction signal for an image stabilization a signal obtained from an output of one of the first filter and the second filter which has a higher cutoff frequency, when the first filter has the third cutoff frequency or the second filter has the fourth cutoff frequency, and in a case where a difference between a first output of the first filter and a second output of the second filter is larger than a threshold, and to select as the correction signal a signal obtained from an output of one of the first filter and the second filter which has a lower cutoff frequency, when the first filter has the third cutoff frequency or the second filter has the fourth cutoff frequency, and in a case where the difference is equal to or smaller than the threshold.

6. The image stabilization apparatus according to claim 5, wherein the third cutoff frequency is higher than the fourth cutoff frequency.

7. The image stabilization apparatus according to claim 5, further comprising:
a first subtracter configured to subtract the first output of the first filter from a first input of the first filter; and
a second subtracter configured to subtract the second output of the second filter from a second input of the second filter,
wherein the signal selector selects as the correction signal an output of one of the first subtracter and the second subtracter which subtracts an output of the other of the first filter and the second filter which has the lower cutoff frequency.

8. An image-pickup apparatus having an image stabilization function comprising:
a vibration detector configured to detect a vibration applied to the image-pickup apparatus;
a first filter configured to receive an output signal from the vibration detector and to gradually decrease a frequency component lower than a first cutoff frequency in the output signal;
a second filter configured to receive the output signal and to gradually decrease a frequency component lower than a second cutoff frequency in the output signal;
a first cutoff frequency switch configured to gradually decrease the first cutoff frequency in the first filter to a third cutoff frequency lower than the first cutoff frequency;
a second cutoff frequency switch configured to gradually decrease the second cutoff frequency in the second filter to a fourth cutoff frequency lower than the second cutoff frequency; and
a signal selector configured to select as a correction signal for an image stabilization a signal obtained from an output of one of the first filter and the second filter which has a higher cutoff frequency,
and thereafter to select as the correction signal a signal obtained from an output of the other of the first filter and the second filter which has a lower cutoff frequency, when the first filter has the third cutoff frequency or the second filter has the fourth cutoff frequency.

9. An image-pickup apparatus having an image stabilization function comprising:
a vibration detector configured to detect a vibration applied to the image-pickup apparatus;
a first filter configured to receive an output signal from the vibration detector and to gradually decrease a frequency component lower than a first cutoff frequency in the output signal;
a second filter configured to receive the output signal and to gradually decrease a frequency component lower than a second cutoff frequency in the output signal;
a first cutoff frequency switch configured to gradually decrease the first cutoff frequency in the first filter to a third cutoff frequency lower than the first cutoff frequency;
a second cutoff frequency switch configured to gradually decrease the second cutoff frequency in the second filter to a fourth cutoff frequency lower than the second cutoff frequency; and
a signal selector configured to select as a correction signal for an image stabilization a signal obtained from an output of one of the first filter and the second filter which has a higher cutoff frequency, when the first filter has the third cutoff frequency or the second filter has the fourth cutoff frequency, and in a case where a difference between a first output of the first filter and a second output of the second filter is larger than a threshold, and to select as the correction signal a signal obtained from an output of one of the first filter and the second filter which has a lower cutoff frequency, when the first filter has the third cutoff frequency or the second filter has the fourth cutoff frequency, and in a case where the difference is equal to or smaller than the threshold.

10. An image stabilization method comprising:
a first step of gradually decreasing a cutoff frequency in a first filter from a first cutoff frequency to a third cutoff frequency lower than the first cutoff frequency, the first filter being configured to gradually decrease a frequency component lower than the cutoff frequency in a vibration detection signal;
a second step of gradually decreasing a cutoff frequency in a second filter from a second cutoff frequency to a fourth cutoff frequency lower than the second cutoff frequency, the second filter being configured to gradually decrease a frequency component lower than the cutoff frequency in the vibration detection signal; and a step of selecting as a correction signal for an image stabilization a signal obtained from an output of one of the first filter and the second filter which has a higher cutoff frequency, and thereafter selecting as the correction signal a signal obtained from an output of the other of the first filter and the second filter which has a lower cutoff frequency, when the first filter has the third cutoff frequency or the second filter has the fourth cutoff frequency.

11. An image stabilization method comprising:
a first step of gradually decreasing a cutoff frequency in a first filter from a first cutoff frequency to a third cutoff frequency lower than the first cutoff frequency, the first filter being configured to gradually decrease a frequency component lower than the cutoff frequency in a vibration detection signal;
a second step of gradually decreasing a cutoff frequency in a second filter from a second cutoff frequency to a fourth cutoff frequency lower than the second cutoff frequency, the second filter being configured to gradually decrease a frequency component lower than the cutoff frequency in the vibration detection signal; and
a step of selecting as a correction signal for an image stabilization a signal obtained from an output of one of the first filter and the second filter which has a higher cutoff frequency, when the first filter has the third cutoff frequency or the second filter has the fourth cutoff frequency, and in a case where a difference between a first output of the first filter and a second output of the second filter is larger than a threshold, and selecting as the correction signal a signal obtained from an output of one of the first filter and the second filter which has a lower cutoff frequency, when the first filter has the third cutoff frequency or the second filter has the fourth cutoff frequency, and in a case where the difference is equal to or smaller than the threshold.

12. An image stabilization apparatus comprising:
a first filter configured to receive an output signal from a vibration detector and to gradually decrease a frequency component lower than a first cutoff frequency in the output signal;
a second filter configured to receive the output signal and to gradually decrease a frequency component lower than a second cutoff frequency in the output signal;
a first cutoff frequency switch configured to gradually decrease the first cutoff frequency in the first filter to a third cutoff frequency lower than the first cutoff frequency;
a second cutoff frequency switch configured to gradually decrease the second cutoff frequency in the second filter to a fourth cutoff frequency lower than the second cutoff frequency and the third cutoff frequency; and
a signal selector configured to select as a correction signal for an image stabilization a signal obtained from an output of the first filter, when the first filter has the third cutoff frequency,
and thereafter to select as the correction signal a signal obtained from an output of the second filter.

13. The image stabilization apparatus according to claim 12, wherein the signal selector selects as the correction signal the signal obtained from the output of the second filter in a case where a difference between a first output of the first filter and a second output of the second filter is equal to or smaller than a threshold.

14. The image stabilization apparatus according to claim 12, further comprising: a first subtracter configured to subtract a first output of the first filter from a first input of the first filter; and
a second subtracter configured to subtract a second output of the second filter from a second input of the second filter,
wherein the signal selector selects as the correction signal an output of the first subtracter, when the first filter has the third cutoff frequency,
and thereafter selects as the correction signal an output of the second subtracter.

15. An image stabilization apparatus comprising:
a first filter configured to receive an output signal from a vibration detector and to gradually decrease a frequency component lower than a first cutoff frequency in the output signal;
a second filter configured to receive the output signal and to gradually decrease a frequency component lower than a second cutoff frequency in the output signal;
a first cutoff frequency switch configured to gradually decrease the first cutoff frequency in the first filter to a third cutoff frequency lower than the first cutoff frequency;
a second cutoff frequency switch configured to gradually decrease the second cutoff frequency in the second filter to a fourth cutoff frequency lower than the second cutoff frequency and the third cutoff frequency; and
a signal selector configured to select as a correction signal for an image stabilization a signal obtained from an output of the first filter, when the first filter has the third cutoff frequency, and in a case where a difference between an output of the first filter and an output of the second filter is larger than a threshold,
and to select as the correction signal a signal obtained from an output of the second filter, when the first filter has the third cutoff frequency, and in a case where the difference is equal to or smaller than the threshold.

16. The image stabilization apparatus according to claim 15, further comprising:
a first subtracter configured to subtract the first output of the first filter from a first input of the first filter; and
a second subtracter configured to subtract the second output of the second filter from a second input of the second filter,
wherein the signal selector selects as the correction signal an output of the first subtracter, when the first filter has the third cutoff frequency, and in a case where the difference is larger than the threshold,
and selects as the correction signal an output of the second subtracter, when the first filter has the third cutoff frequency, and in a case where the difference is equal to or smaller than the threshold.

17. An image-pickup apparatus having an image stabilization function comprising: a vibration detector configured to detect a vibration applied to the image-pickup apparatus;
a first filter configured to receive an output signal from the vibration detector and to gradually decrease a frequency component lower than a first cutoff frequency in the output signal;
second filter configured to receive the output signal and to gradually decrease a frequency component lower than a second cutoff frequency in the output signal;
a first cutoff frequency switch configured to gradually decrease the first cutoff frequency in the first filter to a third cutoff frequency lower than the first cutoff frequency;

a second cutoff frequency switch configured to gradually decrease the second cutoff frequency in the second filter to a fourth cutoff frequency lower than the second cutoff frequency and the third cutoff frequency; and a signal selector configured to select as a correction signal for an image stabilization a signal obtained from an output of the first filter, when the first filter has the third cutoff frequency, and thereafter to select as the correction signal a signal obtained from an output of the second filter.

18. An image-pickup apparatus having an image stabilization function comprising:

a vibration detector configured to detect a vibration applied to the image-pickup apparatus;

a first filter configured to receive an output signal from the vibration detector and to gradually decrease a frequency component lower than a first cutoff frequency in the output signal;

a second filter configured to receive the output signal and to gradually decrease a frequency component lower than a second cutoff frequency in the output signal;

a first cutoff frequency switch configured to gradually decrease the first cutoff frequency in the first filter to a third cutoff frequency lower than the first cutoff frequency;

a second cutoff frequency switch configured to gradually decrease the second cutoff frequency in the second filter to a fourth cutoff frequency lower than the second cutoff frequency and the third cutoff frequency; and a signal selector configured to select as a correction signal for an image stabilization a signal obtained from an output of the first filter, when the first filter has the third cutoff frequency, and in a case where a difference between an output of the first filter and an output of the second filter is larger than a threshold, and to select as the correction signal a signal obtained from an output of the second filter, when the first filter has the third cutoff frequency, and in a case where the difference is equal to or smaller than the threshold.

19. An image stabilization method comprising:

a first step of gradually decreasing a cutoff frequency in a first filter from a first cutoff frequency to a third cutoff frequency lower than the first cutoff frequency, the first filter being configured to gradually decrease a frequency component lower than the first cutoff frequency in a vibration detection signal;

a second step of gradually decreasing a cutoff frequency in a second filter from a second cutoff frequency to a fourth cutoff frequency lower than the second cutoff frequency and the third cutoff frequency, the second filter being configured to gradually decrease a frequency component lower than the second cutoff frequency in the vibration detection signal; and a step of selecting as a correction signal for an image stabilization a signal obtained from an output of the first filter, when the first filter has the third cutoff frequency, and thereafter selecting as the correction signal a signal obtained from an output of the second filter.

20. An image stabilization method comprising:

a first step of gradually decreasing a cutoff frequency in a first filter from a first cutoff frequency to a third cutoff frequency lower than the first cutoff frequency, the first filter being configured to gradually decrease a frequency component lower than the first cutoff frequency in a vibration detection signal;

a second step of gradually decreasing a cutoff frequency in a second filter from a second cutoff frequency to a fourth cutoff frequency lower than the second cutoff frequency and the third cutoff frequency, the second filter being configured to gradually decrease a frequency component lower than the second cutoff frequency in the vibration detection signal; and a step of selecting as a correction signal for an image stabilization a signal obtained from an output of the first filter, when the first filter has the third cutoff frequency, and in a case where a difference between an output of the first filter and an output of the second filter is larger than a threshold, and selecting as the correction signal a signal obtained from an output of the second filter, when the first filter has the third cutoff frequency, and in a case where the difference is equal to or smaller than the threshold.

* * * * *